United States Patent
Sano et al.

(10) Patent No.: US 9,045,130 B2
(45) Date of Patent: Jun. 2, 2015

(54) DEVICE FOR CONTROLLING AUTOMATIC STOPPING OF VEHICLE ENGINE

(71) Applicant: Nissan Motor Co., Ltd., Kanagawa (JP)

(72) Inventors: Ryo Sano, Kanagawa (JP); Takayuki Iwasaki, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/368,416

(22) PCT Filed: Nov. 26, 2012

(86) PCT No.: PCT/JP2012/080449
§ 371 (c)(1),
(2) Date: Jun. 24, 2014

(87) PCT Pub. No.: WO2013/099490
PCT Pub. Date: Jul. 4, 2013

(65) Prior Publication Data
US 2015/0011360 A1    Jan. 8, 2015

(30) Foreign Application Priority Data

Dec. 28, 2011    (JP) ................................. 2011-289533

(51) Int. Cl.
*B60W 10/18*    (2012.01)
*B60W 10/06*    (2006.01)
(Continued)

(52) U.S. Cl.
CPC .............. *B60W 10/06* (2013.01); *Y10T 477/87* (2015.01); *F02D 29/02* (2013.01); *F02D 17/04* (2013.01); *F02N 11/0822* (2013.01); *F02N 11/0837* (2013.01); *F02N 2200/102* (2013.01); *F02N 2200/124* (2013.01); *Y02T 10/48* (2013.01); *B60W 30/18018* (2013.01); *B60W 30/18072* (2013.01); *B60W 2510/0623* (2013.01); *B60W 2520/04* (2013.01); *B60W 2540/12* (2013.01);
(Continued)

(58) Field of Classification Search
None
See application file for complete search history.

(56) References Cited

U.S. PATENT DOCUMENTS

| | | | |
|---|---|---|---|
| 6,346,064 B1 * | 2/2002 | Hada et al. | 477/171 |
| 8,706,366 B2 * | 4/2014 | Kim et al. | 701/54 |
| 2013/0297161 A1* | 11/2013 | Gibson et al. | 701/54 |

FOREIGN PATENT DOCUMENTS

| | | |
|---|---|---|
| JP | 2003-013768 A | 1/2003 |
| JP | 2003-035175 A | 2/2003 |

(Continued)

OTHER PUBLICATIONS

International Search Report issued in PCT/JP2012/080449 mailed on Jan. 22, 2013 (4 pages).

(Continued)

*Primary Examiner* — Dirk Wright
(74) *Attorney, Agent, or Firm* — Osha Liang LLP

(57) ABSTRACT

A vehicular engine automatic stop control apparatus has a coast stop controller that performs a coast stop control of stopping an engine in response to a situation where driver's brake pedal operation is above a predetermined threshold value while a vehicle is traveling, a road surface gradient sensor that senses a road surface gradient, and a coast stop control cancellation unit that cancels the coast stop control in response to a situation where a first sensed value of the road surface gradient is above a predetermined cancellation threshold value in absolute value. The first sensed value of the road surface gradient is obtained at a first time instant when the vehicle becomes stationary in a situation where the engine has been stopped by the coast stop controller.

6 Claims, 5 Drawing Sheets

(51) Int. Cl.
*F02D 29/02* (2006.01)
*F02D 17/04* (2006.01)
*F02N 11/08* (2006.01)
*B60W 30/18* (2012.01)
*B60W 10/184* (2012.01)

(52) U.S. Cl.
CPC ....... *B60W 2550/142* (2013.01); *B60Y 2300/46* (2013.01); *B60W 10/184* (2013.01)

(56) References Cited

FOREIGN PATENT DOCUMENTS

| JP | 2005-207327 | A | 8/2005 |
|---|---|---|---|
| JP | 2008-215293 | A | 9/2008 |
| JP | 2009-041457 | A | 2/2009 |
| JP | 2009-264289 | A | 11/2009 |
| JP | 4374805 | B2 | 12/2009 |
| JP | 2010-242613 | A | 10/2010 |
| JP | 2012-132417 | A | 7/2012 |
| JP | 2012-163140 | A | 8/2012 |
| JP | 2012-202350 | A | 10/2012 |

OTHER PUBLICATIONS

Written Opinion of the International Searching Authority issued in PCT/JP2012/080449 mailed on Jan. 22, 2013 (5 pages).

* cited by examiner

DEVICE FOR CONTROLLING AUTOMATIC STOPPING OF VEHICLE ENGINE

BACKGROUND

1. Technical Field

The present invention relates to an engine automatic stop control apparatus that automatically stops an engine during traveling.

2. Related Art

A patent document 1 discloses an art of vehicular engine automatic stop control apparatus. This document discloses to stop an engine in response to a situation where an amount of depressing operation of a brake pedal is above a coast stop threshold value even while a vehicle is traveling, for enhancing the fuel efficiency.

If the engine is restarted in the same timing with respect to the amount of operation of the brake pedal as on a level road when the vehicle decelerates on a sloping road and then becomes stationary, it is possible that a torque output is delayed and the vehicle is caused to travel, because of action of the inertia of the vehicle.

One or more embodiments of the present invention provides a vehicular engine automatic stop control apparatus that is capable of suitably stopping and restarting an engine while a vehicle is traveling on a sloping road.

Patent Document 1: Japanese Patent No.

SUMMARY OF THE INVENTION

According to one or more embodiments of the present invention, a vehicular engine automatic stop control apparatus stops an engine in response to a situation where driver's brake pedal operation is above a predetermined threshold value while a vehicle is traveling, and cancels a coast stop control in response to a situation where a value of a road surface gradient is above a predetermined cancellation threshold value in absolute value, wherein the value of the road surface gradient is obtained at a time instant when the vehicle becomes stationary thereafter.

This allows to stop or restart the engine in suitable timing even when on a sloping road, and thereby enhance the fuel efficiency and drivability.

DETAILED DESCRIPTION

Embodiments of the invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiment 1

Figure 1:
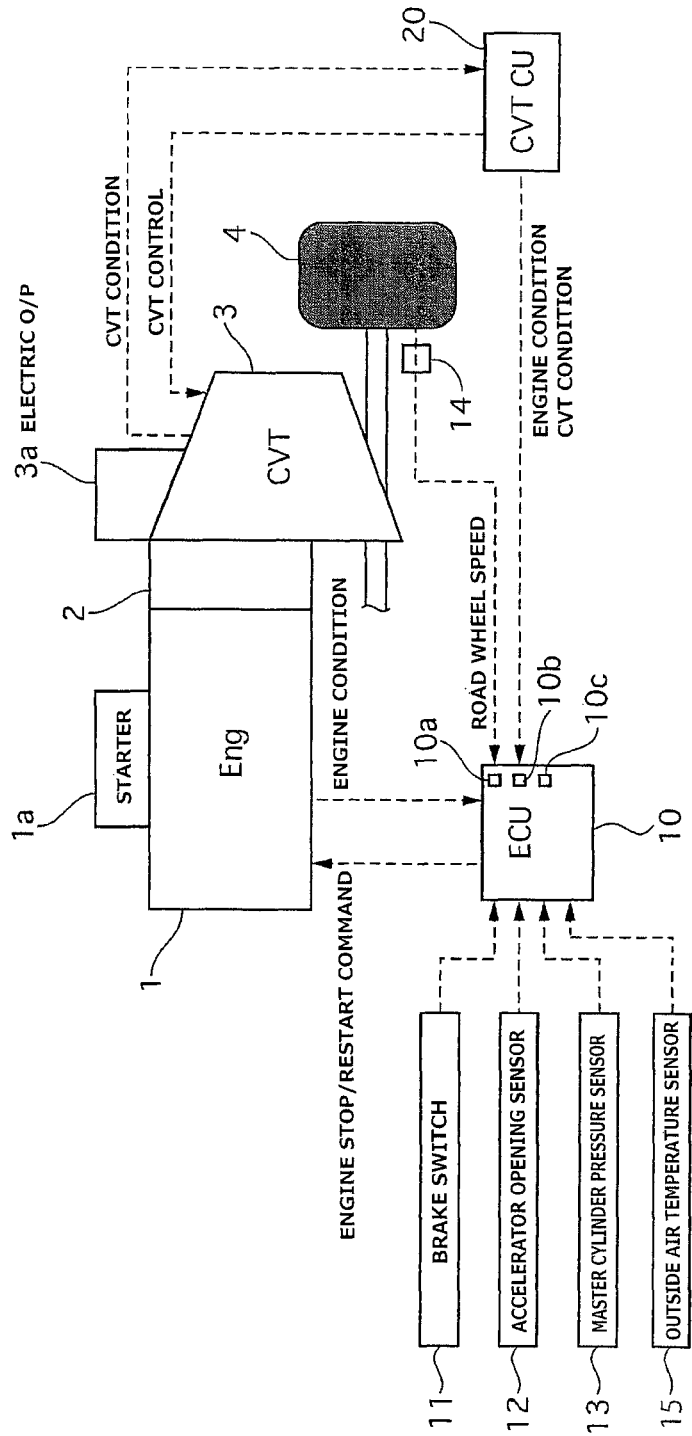
FIG. 1 is a system diagram showing configuration of a vehicular engine automatic stop control apparatus according to a first embodiment.

FIG. 1 is a system diagram showing configuration of a vehicular engine automatic stop control apparatus according to a first embodiment. An engine 1 outputs a driving torque, which is inputted to a belt-type continuous variable transmission 3 through a torque converter 2, and shifted at a desired speed ratio, and then transmitted to driving wheels 4. Engine 1 is an internal combustion engine provided with a starter is for engine start. Specifically, starter 1a is a starter motor which performs engine cranking and fuel injection in response to an engine start command, and stops in response to a situation where engine 1 has been enabled to rotate independently.

Torque converter 2 is disposed on an output side of engine 1, and performs torque amplification at low vehicle speed, and includes a lockup clutch which inhibits relative rotation when the vehicle speed is above a predetermined value such as about 14 [km/h]. Belt-type continuous variable transmission 3 is disposed on an output side of torque converter 2. Belt-type continuous variable transmission 3 is composed of a start clutch, a primary pulley, a secondary pulley, and a belt wound around these pulleys, and establishes a desired speed ratio by varying a pulley groove width by hydraulic control. Belt-type continuous variable transmission 3 includes therein an oil pump driven by engine 1. While the engine is operating, the oil pump serves as an oil pressure source to supply a converter pressure and a lockup clutch pressure of torque converter 2, and a pulley pressure and a clutch engagement pressure of belt-type continuous variable transmission 3.

Moreover, belt-type continuous variable transmission 3 includes an electric oil pump 3a. Electric oil pump 3a is configured to operate to supply required oil pressures to actuators, when the engine is automatically stopped so that oil pressure supply cannot be performed by the oil pump. Accordingly, even when the engine is at rest, belt-type continuous variable transmission 3 is capable of establishing a desired speed ratio and maintaining the clutch engagement pressure.

Operation of engine 1 is controlled by an engine control unit 10. Engine control unit 10 receives input of: a brake signal from a brake switch 11 that outputs an on-signal in response to driver's brake pedal operation; an accelerator signal from an accelerator pedal opening sensor 12 that senses an amount of driver's accelerator pedal operation; a brake operation amount signal (master cylinder pressure) from a master cylinder pressure sensor 13 that senses a master cylinder pressure depending on an amount of brake pedal operation; a road wheel speed from a wheel speed sensor 14 provided at each road wheel (which is identical to a vehicle speed signal in a case where a vehicle speed is determined from the road wheel speed); an outside air temperature signal from an outside air temperature sensor 15 that senses the outside air temperature; a CVT condition signal from a CVT control unit 20 described below; and signals of engine coolant temperature, crank angle, engine rotational speed, etc. Engine control unit 10 starts and automatically stops engine 1 based on the various signals described above. It is not limited to master cylinder pressure sensor 13. Master cylinder pressure sensor 13 may be replaced with a sensor for sensing an amount of brake pedal stroke or a brake pedal depressing force, or a sensor for sensing wheel cylinder pressures, to determine the amount of brake pedal operation and thereby estimate driver's intention of braking operation.

Engine control unit 10 includes therein: a road surface gradient sensing section 10a (road surface gradient sensing means) that senses a road surface gradient of a road on which the vehicle is traveling; a vehicle weight sensing section 10b that senses the weight of the vehicle; and a road surface μ sensing section 10c that estimates a road surface μ based on the outside air temperature. Road surface gradient sensing section 10a estimates the road surface gradient, for example, based on a torque transmitted to the driving wheels, and a difference between an actual vehicle acceleration sensed from the road wheel speed and others and an acceleration acting on the vehicle which is sensed by an acceleration sensor. Vehicle weight sensing section 10b senses a suspension stroke and others, and determines the vehicle weight based on the degree of sinking of the vehicle when the vehicle is stationary. Road surface μ sensing section 10c determines that the road surface is likely to be frozen and the road surface friction coefficient is small, when the outside air temperature is below 4° C. for example. In a case where another controller such as an ABS controller performs an operation of estimating the road surface friction coefficient, the information of road surface μ estimated by the other controller may be used other than the outside air temperature.

CVT control unit 20 sends a CVT condition signal to engine control unit 10 and receives an engine operation condition signal from engine control unit 10. CVT control unit 20 controls the speed ratio and others of belt-type continuous variable transmission 3 based on these signals. Specifically, when a drive range is selected, CVT control unit 20 engages the start clutch, and determines the speed ratio from a speed ratio map based on the accelerator pedal opening and the vehicle speed, and controls pulley oil pressures. CVT control unit 20 disengages the lockup clutch when the vehicle speed is lower than a predetermined value, and engages the lockup clutch to directly couple the engine 1 and belt-type continuous variable transmission 3 when the vehicle speed is higher than or equal to the predetermined value. Moreover, at the time of engine automatic stop when the drive range is being selected, CVT control unit 20 operates electric oil pump 3a for ensuring a required oil pressure.

<Engine Automatic Stop Control Process> The following describes an engine automatic stop control process. The vehicular engine automatic stop control apparatus of the first embodiment performs a so-called idling stop control of stopping engine idling in response to a situation where a predetermined condition is satisfied when the vehicle is stationary. The idling stop control may be implemented by a known configuration, and accordingly, detailed description thereof is omitted herein. In addition to the idling stop control, the vehicular engine automatic stop control apparatus performs a coast stop control of stopping the engine 1 when determining that it is highly possible that the vehicle becomes stationary to start the idling stop control, while the vehicle is decelerating even when the vehicle is traveling.

A vehicle provided with a typical idling stop function which does not perform the coast stop control stops fuel injection and maintain the engine rotational speed by a coast torque transmitted from driving wheels 4 through the lockup clutch, when the vehicle is in a so-called coast running state in which the vehicle is running by inertia without driver's accelerator pedal operation (the coast running state including a condition when the brake pedal is operated). However, when the vehicle has decelerated to a predetermined value, the lockup clutch is disengaged so that engine 1 will be stopped unless fuel injection is performed. Accordingly, it restarts fuel injection and thereby maintains independent rotation of the engine in the timing when the lockup clutch is disengaged. Thereafter, after it is determined whether or not conditions such as a condition that the vehicle is completely stationary and a condition that the brake pedal is sufficiently depressed are satisfied, engine idling is stopped.

If it is possible to further reduce the amount of fuel when fuel injection is restarted during a process where fuel injection is temporarily restarted from a condition where the vehicle is running with fuel injection stopped, and then the engine is stopped again, it is possible to improve the fuel efficiency. Accordingly, the vehicular engine automatic stop control apparatus performs a coast stop control of not restarting fuel injection but maintaining fuel injection stopped (inhibiting fuel injection, etc.) when a predetermined condition is satisfied during coast running. After it is determined that the predetermined condition is satisfied after the vehicle becomes stationary, it shifts to a normal idling stop control.

The condition for performing the coast stop control includes a requirement that the amount of driver's brake pedal operation is within a predetermined range (namely, between an upper limit and a lower limit). This is because the start and termination of the coast stop control should be performed based on driver's intention of braking. Specifically, when the brake pedal is depressed hard, it is conceivable that the vehicle is rapidly decelerated so that a time period from a predetermined vehicle speed to the vehicle stationary condition is short. In this situation, it is necessary to shift the speed ratio of belt-type continuous variable transmission 3 to the lowest side when the vehicle becomes stationary. However, for that shifting, rotation of driving wheels 4 is required by a principle of shifting of belt-type continuous variable transmission 3. Accordingly, engine stopping is undesirable, because it is necessary to ensure the amount of discharge of the oil pump in order to allow a quick shift while driving wheels 4 are rotating. Moreover, it is possible that during a rapid deceleration, an ABS control or the like is performed to prevent a wheel lock. The ABS control has a control logic where various gains are set in consideration of a torque input from the engine side, for increase and decrease of the brake fluid pressure applied to the road wheels. Accordingly, if engine stopping is performed carelessly, it is possible that the ABS control or the like may be adversely affected. In consideration of that, a coast stop permission upper limit is set.

On the other hand, during a soft deceleration condition where the brake pedal is softly depressed, two situations are conceivable, one is a situation where the vehicle becomes stationary thereafter, and the other is a situation where the brake pedal is released again and the vehicle is restarted. For example, it is conceivable that when the vehicle is running in a traffic jam, the running state is continued with the brake pedal softly operated. In this situation, if the engine is stopped carelessly, the engine stop and restart may be repeated to make the driver uncomfortable. Moreover, the deriver may be made to feel an instantaneous push by an output of the engine torque to the driving wheels if the engine is restarted under the condition that the brake pedal is softly depressed after the engine is stopped. In consideration of that, a coast stop permission lower limit is set.

Figure 2:
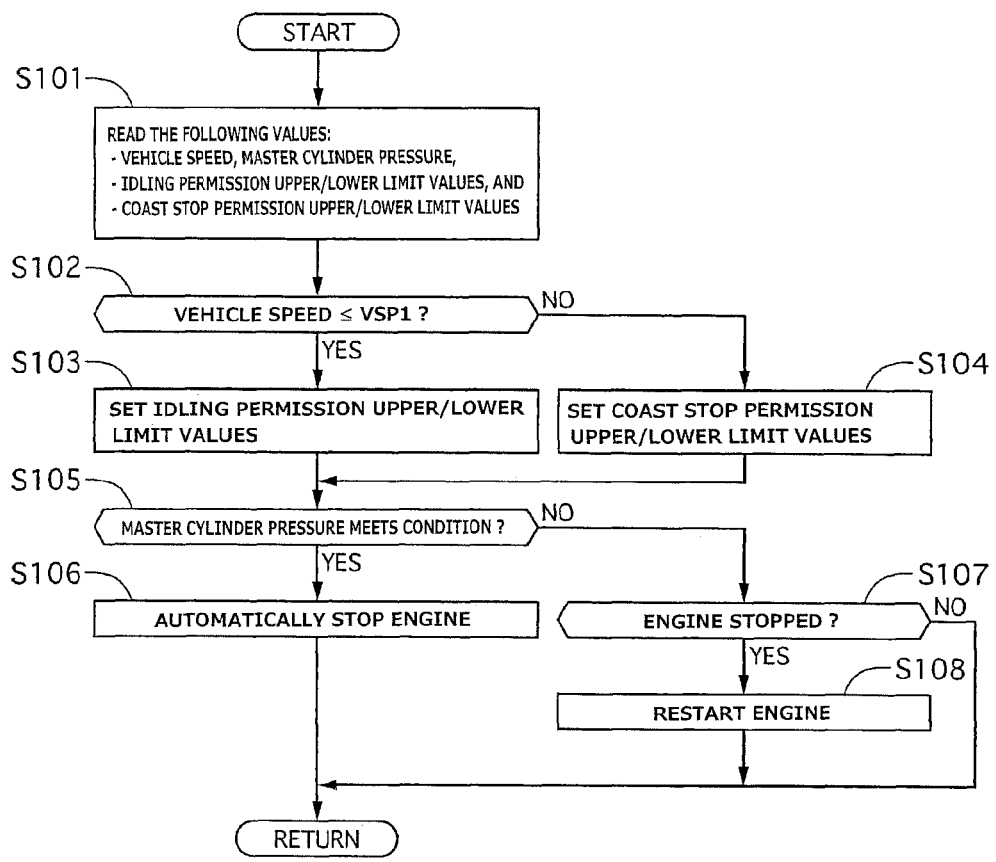
FIG. 2 is a flow chart showing an engine automatic stop/restart control process according to the first embodiment.

<Engine Automatic Stop and Restart Control Process>
FIG. 2 is a flow chart showing an engine automatic stop/restart control process according to the first embodiment. Conditions may be added other than those shown in the flow chart. At Step S101, it reads the vehicle speed, master cylinder pressure, idling stop permission lower/upper limit values as reference, and coast stop permission lower/upper limit values as reference. The vehicle speed may be an average of road wheel speeds or an average of non-driving road wheel speeds sensed by wheel speed sensors 14, and is not so limited. The idling stop permission upper limit and coast stop permission upper limit are preset in the system, which are constant values in the first embodiment. The idling stop permission lower limit is set greater than the coast stop permission lower limit. This is because the vehicle is stationary under the condition where idling stop is performed. If the engine is restarted in this situation, a creep torque occurs to move the vehicle undesirably under the condition where the braking force of the brake is small. Moreover, the coast stop is performed when the vehicle is decelerating (namely, traveling). In this situation, it is intended to improve the fuel efficiency by maintaining the engine stopped as long as possible. Even if the engine is restarted before the vehicle becomes stationary, the driver does not feel well an instantaneous push resulting from the creep torque when the vehicle is running.

At Step S102, it determines whether or not the vehicle speed is lower than or equal to a predetermined value VSP1 indicating a vehicle stationary condition. When the vehicle speed is lower than or equal to the predetermined value VSP1, it proceeds to Step S103. Otherwise, it proceeds to Step S104. The predetermined value VSP1 may be zero, or a value about 1 to 2 [km/h] in an extremely low vehicle speed region. It is sufficient that the predetermined value VSP1 is a value with which it can be determined that the vehicle is substantially stationary.

Figure 4:
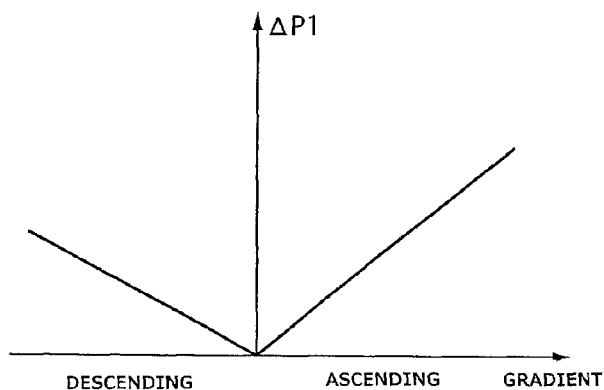
FIG. 4 is a map of gradient compensation amount according to the first embodiment.

At Step S103, it sets an idling stop permission upper limit and an idling stop permission lower limit, which are an upper limit and a lower limit of a region of the amount of brake pedal operation in which the idling stop control is permitted. In the first embodiment, the idling stop permission upper limit is a constant value and the value obtained at Step S101 is used without correction. On the other hand, the idling stop permission lower limit is corrected. FIG. 4 is a map of gradient compensation amount setting according to the first embodiment. The idling stop permission lower limit is corrected by reading a gradient compensation amount ΔP1 based on the sensed road surface gradient and adding the gradient compensation amount ΔP1 to the uncorrected value. This map is common between the setting of the idling stop permission lower limit and the setting of the coast stop permission upper limit, so that the idling stop permission lower limit and the coast stop permission upper limit are offset in parallel, which are described in detail below. They may be further corrected based on the vehicle weight described below.

At Step S104, it determines the coast stop permission upper limit and coast stop permission lower limit, which are an upper limit and a lower limit of a region of the amount of brake pedal operation in which the coast stop control is permitted. In the first embodiment, the coast stop permission upper limit is a constant value and the value obtained at Step S101 is used without correction. On the other hand, the coast stop permission lower limit is corrected. This correction operation is described in detail below.

At Step S105, it determines whether or not the master cylinder pressure is within a range between the upper limit and the lower limit. When it is determined that the master cylinder pressure is within the range, it proceeds to Step S106. On the other hand, when it is determined that the master cylinder pressure is out of the range, it proceeds to Step S107 where it determines whether or not to stop the engine. When the engine is stopped, it proceeds to Step S108 where it restarts the engine. When the engine is operating, the engine is maintained to operate.

Figure 3:
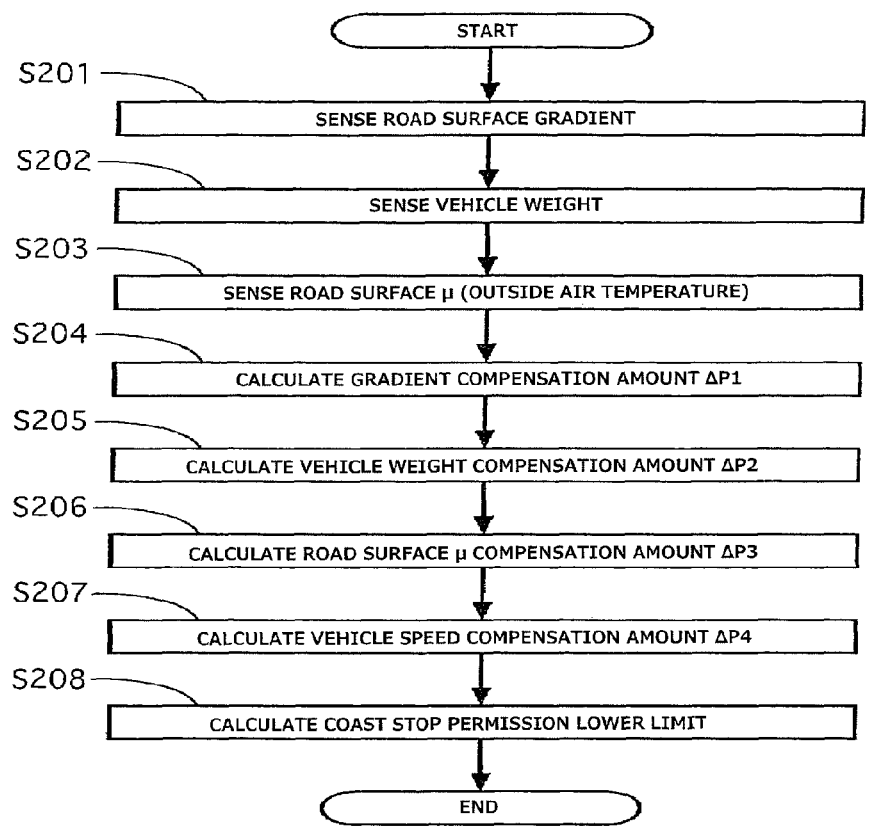
FIG. 3 is a flow chart showing a coast stop permission lower limit setting process according to the first embodiment.

<Setting of Coast Stop Permission Lower Limit> The following describes the setting of coast stop permission lower limit. FIG. 3 is a flow chart showing a coast stop permission lower limit setting process according to the first embodiment. At Step S201, the road surface gradient sensing section 10a senses the road surface gradient. At Step S202, the vehicle weight sensing section 10b senses the vehicle weight. At Step S203, the road surface μ sensing section 10c senses the road surface μ.

At Step S204, it calculates the gradient compensation amount ΔP1 based on the gradient compensation map of FIG. 4, wherein Step S204 corresponds to a threshold value setting means. FIG. 4 is the map of gradient compensation amount according to the first embodiment. Specifically, the gradient compensation amount ΔP1 is set to increase as the absolute value of the sensed gradient. This is because if the coast stop is permitted above a low master cylinder pressure on an ascending slope, it is possible that a driver has an intention of continuing the travel of the vehicle close to the stationary condition and releases the brake pedal, so that the engine restart timing is delayed and the vehicle is rolled back because of the ascending slope.

On the other hand, if the coast stop is permitted under the condition where the master cylinder pressure is low on a descending slope, when the driver intends to continue the running state close to the stationary condition and releases the brake pedal, the engine restart timing may be delayed, and the vehicle is likely to move because the braking force is small, and the creep torque when the engine is restarted may cause a pushing feel because the slope is descending.

ΔP1 is set larger when on an ascending slope than when on a descending slope. This is because it is important to prevent a rollback, i.e. to prevent the vehicle from moving in a direction undesirable by the driver. Namely, it enhances the fuel efficiency by actively performing the coast stop when on a descending slope, and performs the coast stop while preventing the rollback when on an ascending slope.

Figure 5:
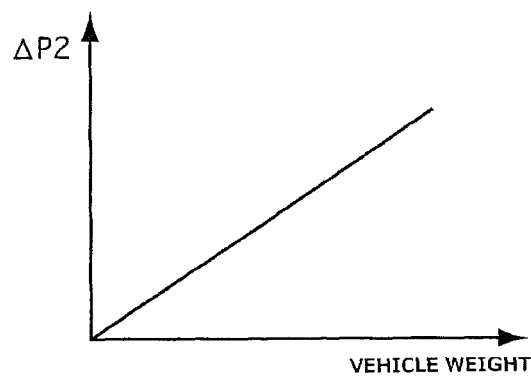
FIG. 5 is a map of vehicle weight according to the first embodiment.

At Step S205, it calculates a vehicle weight compensation amount ΔP2 based on a map of vehicle weight of FIG. 5. Specifically, the vehicle weight compensation amount ΔP2 is set to increase as the sensed vehicle weight increases. This is because if the coast stop is permitted at low master cylinder pressure when on a level road, when the driver intends to continue the running state and releases the brake pedal, the engine restart timing is delayed and the responsiveness at vehicle start may fail to be ensured because the inertia of the vehicle is large when the vehicle weight is large. When on an ascending slope, the rollback is likely to occur if the vehicle weight is large. When on a descending slope, it is likely to cause an unintended start if the vehicle weight is large.

Figure 6:
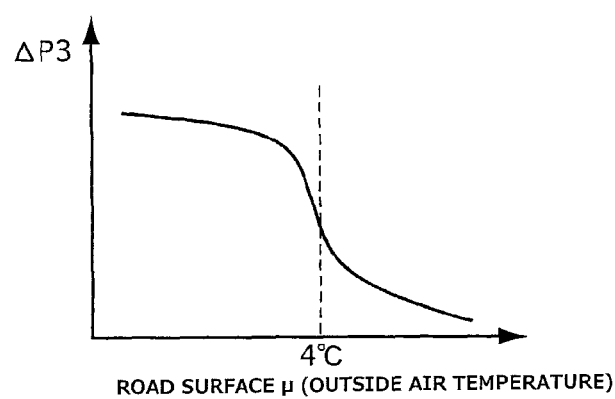
FIG. 6 is a map of road surface $\mu$ according to the first embodiment.

At Step S206, it calculates a road surface μ compensation amount ΔP3 based on a map of road surface μ of FIG. 6. Specifically, the road surface μ compensation amount ΔP3 is set to increase as the sensed road surface μ decreases. Especially, when in a region where the road surface is likely to be frozen (for example, a condition where the outside air temperature is lower than 4° C.), it is possible that road surface μ suddenly becomes low, so that road surface μ compensation amount ΔP3 is rapidly increased. This serves to substantially inhibit the coast stop when the road surface μ becomes small so that the ABS control or the like is likely to be performed, because the coast stop permission lower limit is high even when the driver depresses the brake pedal hard.

Figure 7:
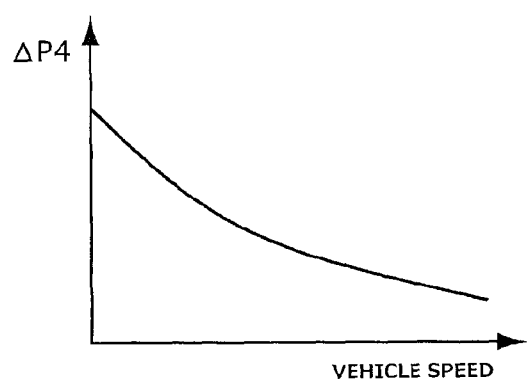
FIG. 7 is a map of vehicle speed according to the first embodiment.

At Step S207, it calculates a vehicle speed compensation amount ΔP4 based on a map of vehicle speed of FIG. 7. Specifically, the vehicle speed compensation amount ΔP4 is set to increase as the sensed vehicle speed decreases. Namely, it improves the fuel efficiency by permitting the coast stop as long as possible under the condition that the vehicle speed is high to some extent, and quickly identifies a derivers restart intention, and thereby prevents the rollback when on an ascending slope, and suppresses the pushing feel when on a descending slope, under the condition that the vehicle is close to the stationary condition.

Figure 8:
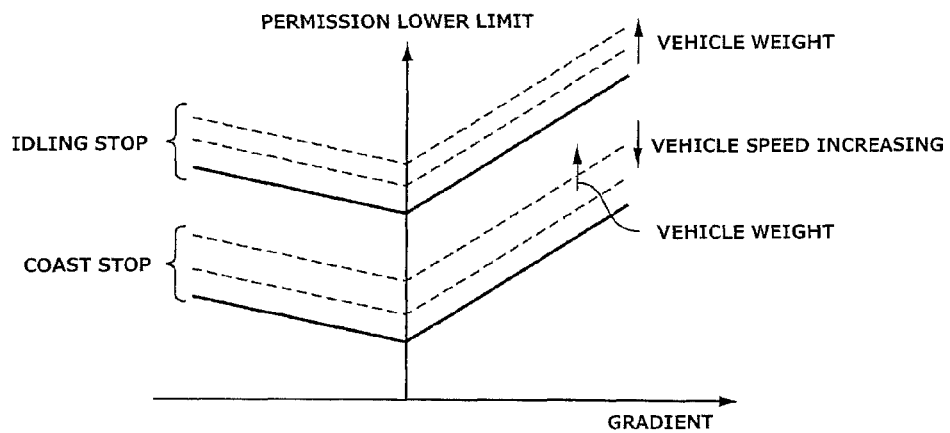
FIG. 8 is a diagram showing a relationship between an idling stop permission lower limit and a coast stop permission lower limit according to the first embodiment.

At Step S208, it calculates finally the coast stop permission lower limit based on the gradient compensation amount ΔP1, vehicle weight compensation amount ΔP2, road surface μ compensation amount ΔP3, and vehicle speed compensation amount ΔP4. Specifically, these compensation amounts may be added or multiplied with suitably set gains. FIG. 8 is a diagram showing a relationship between the idling stop permission lower limit and the coast stop permission lower limit according to the first embodiment. The idling stop permission lower limit is set to increase as the gradient increases. If the idling stop permission lower limit is set based on the vehicle weight, the idling stop permission lower limit is set to increase as the vehicle weight increases. On the other hand, the coast stop permission lower limit is lower than the idling stop permission lower limit, and is set to increase as the gradient increases and as the vehicle weight increases and as the vehicle speed decreases.

Figure 9:
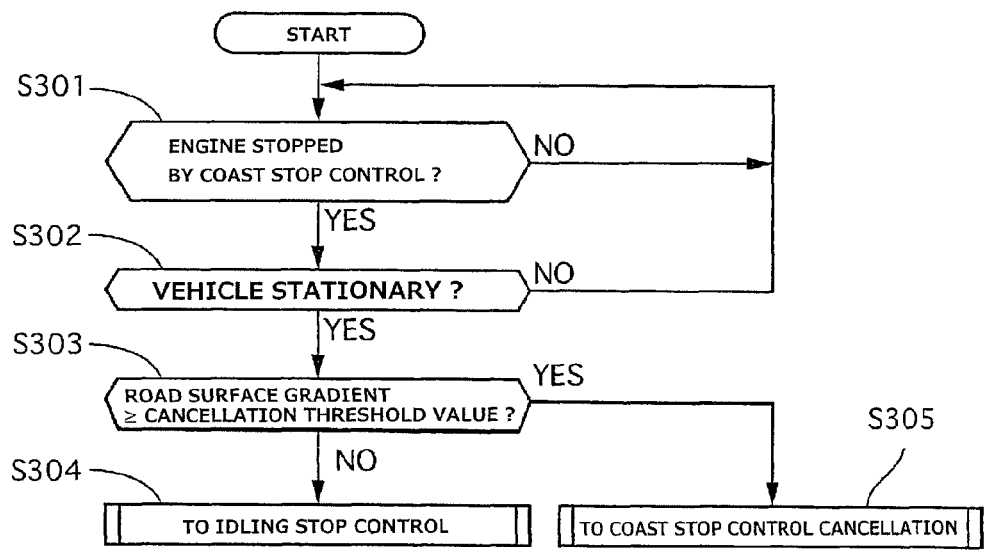
FIG. 9 is a flow chart showing a coast stop control cancellation process according to the first embodiment.

The following describes a coast stop control cancellation process. FIG. 9 is a flow chart showing a coast stop control cancellation process according to the first embodiment. At Step S301, it determines whether or not the engine is being stopped by the coast stop control. When the engine is being stopped, it proceeds to Step S302. Otherwise, it repeats this step. At Step S302, it determines whether or not the vehicle is stationary. When determining that the vehicle is stationary, it proceeds to Step S303. When determining that the vehicle is running, it returns to Step S301. Whether or not the vehicle is stationary is determined based on whether or not the value of the road wheel speed sensor is lower than or equal to a predetermined value indicating that the vehicle is stationary. Accordingly, this condition that the vehicle is substantially stationary includes a condition that the vehicle is in a state before the vehicle becomes completely stationary. At Step S303, it determines whether or not the road surface gradient sensed by road surface gradient sensing section 10a is greater than or equal to a cancellation threshold value. When the road surface gradient is greater than or equal to the cancellation threshold value, it proceeds to Step S305 where it cancels the coast stop control. On the other hand, when the road surface gradient is smaller than the cancellation threshold value, it proceeds to a determination about the idling stop control start condition while maintaining the engine stopped.

The following describes effects. The road surface on which the vehicle is running is not limited to a level road surface but includes a sloping road surface. If the road surface gradient is determined when the vehicle is running, it is possible to perform a control conformed to the road surface gradient at that moment, but at the time instant when the vehicle actually becomes stationary, the vehicle may be on a level road surface having no gradient, or may be a sloping road surface having a gradient although the vehicle has been running on a level road.

If the vehicle becomes stationary on a sloping road, the vehicle may move back if the amount of depression of the brake pedal by the driver is insufficient. It shifts to the idling stop control after the vehicle becomes stationary by the coast stop control. As a condition for starting the idling stop control, it determines whether or not the vehicle is completely stationary for a predetermined time period. Accordingly, even when the vehicle is stationary, it is possible that the engine is stopped under the coast stop control. In this situation, since the idling stop control is configured to perform various judgments based on the assumption that the engine is operating, it is impossible to solve problems under a condition where the engine is stopped before start of the idling stop.

Accordingly, it is configured to sense a gradient in response to a situation where the vehicle becomes stationary while the engine has been stopped by the coast stop control, wherein the sensed gradient is obtained at the moment when the vehicle becomes stationary, and cancels the coast stop control and restarts the engine in response to a situation where the gradient is above the predetermined cancellation threshold value indicating the possibility of movement of the vehicle. This serves to produce a creep torque and thereby suppress movement of the vehicle. In other words, when the vehicle is running, cancellation of the coast stop control is inhibited, even if the gradient is above the cancellation threshold value, and the stopped condition of the engine is continued if the amount of deriver's brake pedal operation is within the predetermined range as described above. Accordingly, it is determined independently from the control of changing the coast stop permission lower limit and the like based on the road surface gradient.

As described above, the first embodiment produces the following produced effects.

<1> It includes: Step S106 (coast stop control means) that performs a coast stop control of stopping an engine in response to a situation where driver's brake pedal operation is above a coast stop permission lower limit (predetermined threshold value) while a vehicle is traveling; road surface gradient sensing section 10a (road surface gradient sensing means) that senses a road surface gradient; and Step S303 (coast stop control cancellation means) that cancels the coast stop control in response to a situation where a first sensed value of the road surface gradient is above a predetermined cancellation threshold value in absolute value, wherein the first sensed value of the road surface gradient is obtained at a first time instant when the vehicle becomes stationary in a situation where the engine has been stopped by the coast stop control means. This allows to stop or restart the engine in suitable timing even when on a sloping road, and thereby enhance the fuel efficiency and drivability.

<2> Step S303 inhibits the coast stop control from being canceled in response to a situation where a second sensed value of the road surface gradient is above the predetermined cancellation threshold value, wherein the second sensed value of the road surface gradient is obtained by the road surface gradient sensing section 10a when the vehicle is traveling. This serves to avoid unintended restart of the engine when the vehicle is traveling.

<3> It further includes an idling stop control section (idling stop control means) that stops the engine in response to a situation where a predetermined condition is satisfied when the vehicle is stationary, wherein Step S303 cancels the coast stop control during a time period from the first time instant to a second time instant when the idling stop control means determines that the engine has been stopped. This allows engine restart when it is necessary during a time period until the idling stop control is started, and thereby allows an earlier engine start as compared to a case where the engine is restarted without satisfaction of the condition of the idling stop control.

<4> The road surface gradient sensing section 10a employs an acceleration sensor for sensing the road surface gradient. This serves to achieve accurate judgment by sensing the road surface gradient based on the acceleration that relates most intimately to the gradient information under the condition where the vehicle is substantially stationary.

Although the present invention is described above with reference to the first embodiment, the present invention is not limited to the first embodiment but includes other configurations. For example, although the belt-type continuous variable transmission is employed in the first embodiment, it may be configured to include a non-continuous automatic transmission or a manual transmission. Although the torque converter is provided in the embodiment, it may be applied to a vehicle provided with no torque converter. Although the starter is a typical starter motor, the starter may be of another type. For example, an alternator connected to the crankshaft of the engine through the belt may be used also as a motor, and initial start and restart of the engine is implemented by this motor. Alternatively, in a hybrid electric vehicle, a motor generator which performs power running and regenerative running may be used to restart the engine.

Although the various compensation amounts are determined by using the maps in the shown example, they may be determined by calculation or the like, or it may be configured that the gradient of a compensation amount in the map is corrected based on another compensation amount. Although the idling stop control is performed in the configuration of the first embodiment, it may be configured so that no idling stop control is performed. Although the various threshold values are set depending on the road surface gradient when the coast stop control is performed when the vehicle is running, the various threshold values may be set in no consideration of the road surface gradient.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicular engine automatic stop control apparatus comprising:
    a coast stop controller that performs a coast stop control of stopping an engine in response to a situation where driver's brake pedal operation is above a predetermined threshold value while a vehicle is traveling;
    a road surface gradient sensor that senses a road surface gradient; and
    a coast stop control cancellation unit that cancels the coast stop control in response to a situation where a first sensed value of the road surface gradient is above a predetermined cancellation threshold value in absolute value,
    wherein the first sensed value of the road surface gradient is obtained at a first time instant when the vehicle becomes stationary in a situation where the engine has been stopped by the coast stop controller,
    wherein the coast stop control cancellation unit inhibits the coast stop control from being canceled in response to a situation where a second sensed value of the road surface gradient is above the predetermined cancellation threshold value, and
    wherein the second sensed value of the road surface gradient is obtained when the vehicle is traveling.

2. The vehicular engine automatic stop control apparatus as claimed in claim 1, further comprising:
    an idling stop controller that stops the engine in response to a situation where a predetermined condition is satisfied when the vehicle is stationary,
    wherein the coast stop control cancellation unit cancels the coast stop control during a time period from the first time instant to a second time instant when the idling stop controller determines that the engine has been stopped.

3. The vehicular engine automatic stop control apparatus as claimed in claim 1, wherein the road surface gradient sensor employs an acceleration sensor for sensing the road surface gradient.

4. The vehicular engine automatic stop control apparatus as claimed in claim 2, wherein the road surface gradient sensor employs an acceleration sensor for sensing the road surface gradient.

5. A vehicular engine automatic stop control apparatus comprising:
    a coast stop controller that performs a coast stop control of stopping an engine in response to a situation where driver's brake pedal operation is above a predetermined threshold value while a vehicle is traveling;
    a road surface gradient sensor that senses a road surface gradient;
    a coast stop control cancellation unit that cancels the coast stop control in response to a situation where a first sensed value of the road surface gradient is above a predetermined cancellation threshold value in absolute value, wherein the first sensed value of the road surface gradient is obtained at a first time instant when the vehicle becomes stationary in a situation where the engine has been stopped by the coast stop controller; and
    an idling stop controller that stops the engine in response to a situation where a predetermined condition is satisfied when the vehicle is stationary,
    wherein the coast stop control cancellation unit cancels the coast stop control during a time period from the first time instant to a second time instant when the idling stop controller determines that the engine has been stopped.

6. The vehicular engine automatic stop control apparatus as claimed in claim 5, wherein the road surface gradient sensor employs an acceleration sensor for sensing the road surface gradient.

* * * * *